United States Patent [19]

Stauffer et al.

[11] 3,952,297

[45] Apr. 20, 1976

[54] CONSTANT WRITING RATE DIGITAL STROKE CHARACTER GENERATOR HAVING MINIMAL DATA STORAGE REQUIREMENTS

[75] Inventors: Franklin K. Stauffer, Sudbury; Phillip R. Smith, Acton, both of Mass.

[73] Assignee: Raytheon Company, Lexington, Mass.

[22] Filed: Aug. 1, 1974

[21] Appl. No.: 493,451

[52] U.S. Cl. .............................. 340/324 A; 235/198

[51] Int. Cl.² .............................................. G06F 3/14

[58] Field of Search ......... 340/324 A, 324 AD, 325, 340/379; 235/198

[56] References Cited

UNITED STATES PATENTS

| | | | |
|---|---|---|---|
| 3,510,865 | 5/1970 | Callahan et al. | 340/324 A |
| 3,587,083 | 6/1971 | Tubinis | 340/324 A |
| 3,597,757 | 8/1971 | Vincent-Carrefour et al. | 340/324 A |
| 3,696,391 | 10/1972 | Peronneau | 340/324 A |
| 3,742,484 | 6/1973 | Rosenthal | 340/324 A |
| 3,755,805 | 8/1973 | Dandrel et al. | 340/324 A |
| 3,775,760 | 11/1973 | Strathman | 340/324 A |
| 3,789,200 | 1/1974 | Childress et al. | 340/324 A |

*Primary Examiner*—Marshall M. Curtis
*Attorney, Agent, or Firm*—John R. Inge; Joseph D. Pannone; Milton D. Bartlett

[57] ABSTRACT

A digital character generator with minimal storage requirements for use in random access display systems. Each character or symbol is made up of patterns of straight line segments called macro-strokes. Each macro-stroke in turn is made up of a predetermined number of connected portions or micro-strokes lying in a straight line. Each micro-stroke is of substantially the same length independent of the number of micro-strokes in a macro-stroke and of the directional orientation of the macrostroke. To store a character or symbol each macro-stroke is divided into its micro-strokes and the micro-strokes resolved into X and Y components. The X and Y components are stored along with the number of micro-strokes in the particular macro-stroke. Along with this information is stored the address and memory of the next macro-stroke within the character or symbol. The X and Y components of the micro-strokes are continuously accumulated until the end of the macro-stroke is reached as determined by the number of micro-strokes within the macro-stroke. The memory is then sequenced to the next address to begin the generation of the next macro-stroke.

22 Claims, 5 Drawing Figures

CONSTANT WRITING RATE DIGITAL STROKE CHARACTER GENERATOR HAVING MINIMAL DATA STORAGE REQUIREMENTS

The invention herein described was made in the course of or under a contract or subcontract thereunder with the Department of Defense.

BACKGROUND OF THE INVENTION

1. Field of the Invention

The invention relates to digital character generation as applied to random access display systems. The invention is of particular use in random access radar cathode-ray tube displays although it is by no means limited thereto.

2. Description of the Prior Art

The earliest display systems wherein it was desired to synthetically produce a random assortment of characters and symbols and to display them on a cathode-ray tube display screen either by themselves or interspersed with other data presentations was the raster scan display technique. In this type of display characters were typically generated as a pattern of dots, the dots lying along the raster scan lines. The dot patterns were usually stored digitally as patterns of binary numbers. Although such systems were relatively inexpensive, the quality of symbol produced was limited by the density of raster scan lines. Moreover, one dot had to be stored for each possible dot location in the patterns. With such systems, it was difficult to produce complicated character patterns because of storage requirements and available raster line density.

The advent of random access display systems wherein the beam may be positioned to any addressed point on the face of the cathode-ray tube made it possible to generate character or symbol patterns as continuous cursively written patterns much as one would write such a pattern by hand. The elimination of the requirement that the character or symbol patterns be produced with dots made it possible to produce patterns of widely varying sizes while yet retaining the readability of the patterns. Moreover, the patterns were then not restricted to what could be produced by dot character and symbol generators.

In early cursive character and symbol generators, the patterns were generated by using analog techniques much as is used to produce the familiar Lissajous patterns. Of course, in such systems the variety of patterns was limited by the available analog waveform generating techniques.

The next group of character and symbol generator approaches generated the character or symbol patterns by a series of interconnected strokes. The strokes were produced by interrelated X and Y ramp shaped signals. The ramps were produced by activation of selected resistors in respective X and Y resistor weighing networks. Such systems were capable of producing good quality cursive character and symbol patterns but they tended to be relatively expensive because of tight tolerance requirements upon the resistance value of the weighing resistors, the number of resistors required, and the relative complexity of the control circuitry. Many adjustments were required to compensate for skew delaying between X and Y channels, the gain of the two channels, and for the relative frequency responses of the two channels. The character patterns were frequently subject to distortion by noise present in the DC power supplied to the system as well as to any noise present within the circuitry itself such as cross talk between the X and Y channels.

Attempts to alleviate the problems inherent in the previously described system included one in which the character or symbols were generated by stroke patterns and in which the end points of the stroke patterns were stored in a read only memory. The patterns were generated by producing signals representing the interconnection of the end points. The expensive resistor weighing networks were thereby eliminated. However, the system was still subject to noise because of the difficulty of producing analog circuitry for generating the signals connecting the prestored end points. Moreover, additional difficulties were encountered in producing end point connecting signals wherein the rate of movement of the beam upon the cathode-ray tube screen was substantially constant among all strokes within all the character or symbol patterns within the stored repertoire. Changes in the rate of movement required compensating video circuitry so that all segments of the characters appeared at the same brightness level upon the cathode-ray tube screen.

Still later attempts included one in which the overall character patterns were stored by storing a large number of closely spaced points along the lines of the character assemble pattern. The overall patterns were generated by generating signals connecting these small closely spaced points. Of course, large amounts of storage were required to implement these schemes because of the large number of points which necessarily had to be stored. The cost of the system is correspondingly quite typically high.

SUMMARY OF THE INVENTION

Accordingly, it is an object of the present invention to provide a completely digital character generator with minimal digital data storage requirements.

Moreover, it is an object of the present invention to provide a character generator in which the susceptibility to induced noise is minimal.

Furthermore, it is an object of the present invention to provide a character generator in which the rate of beam movement is substantially constant for all strokes or segments within the character or symbol patterns.

These as well as other objects of the present invention are met by a character generator in which characters are produced as patterns of straight-line segments called macro-strokes, each macro-stroke being made up of a predetermined number of interconnected portions or micro-strokes. The length of the micro-strokes is substantially constant among all possible macro-strokes and for all possible orientations of the macro-strokes.

The micro-strokes are resolved into X and Y component lengths and stored in a read only memory. Along with the X and Y components of the micro-strokes is stored a number corresponding to the number of micro-strokes in the corresponding macro-stroke. Only one set of stored numbers is necessary for each macro-stroke in the character or symbol. The micro-stroke segments are accumulatively added once for each micro-stroke in the macro-stroke thereby reaching the desired end point of the macro-stroke.

A counter is provided which operates in response to the addition function. In a preferred embodiment a micro-stroke counter is preset with the number of micro-strokes in the macro-stroke and decremented one count each time a micro-stroke segment is added to the present position. When the count reaches zero the memory is cycled to the storage locations corresponding to the next macro-stroke in sequence in the character or symbol being written. Alternatively, a counter may be started upwards from zero with its output constantly compared with the number of micro-strokes.

Along with each set of micro-stroke lengths and number of micro-strokes in the macro-stroke is stored the stored address and the memory for the next set of data. An unblanking signal is also provided.

In the preferred embodiment, the memory is addressed by an address counter which is preset by either the code corresponding to the desired character or to the next address as stored in the memory.

In display system usage, a refresh memory is provided to repeatively activate the character generator at a rate so as to eliminate flicker of the characters as viewed upon the cathode-ray tube screen. The refresh memory is updated by a central computer which formats input data as received from a digitized radar input or other digitized inputs including keyboards.

In the preferred embodiment, digital-to-analog converters are coupled to the respective X and Y digital outputs of the character generator. The outputs of the digital-to-analog converters are filtered to produce the desired X and Y analog deflection signals. These signals are amplified by X and Y deflection amplifiers prior to being coupled to the deflection coils.

DESCRIPTION OF THE PREFERRED EMBODIMENT

Figure 1:
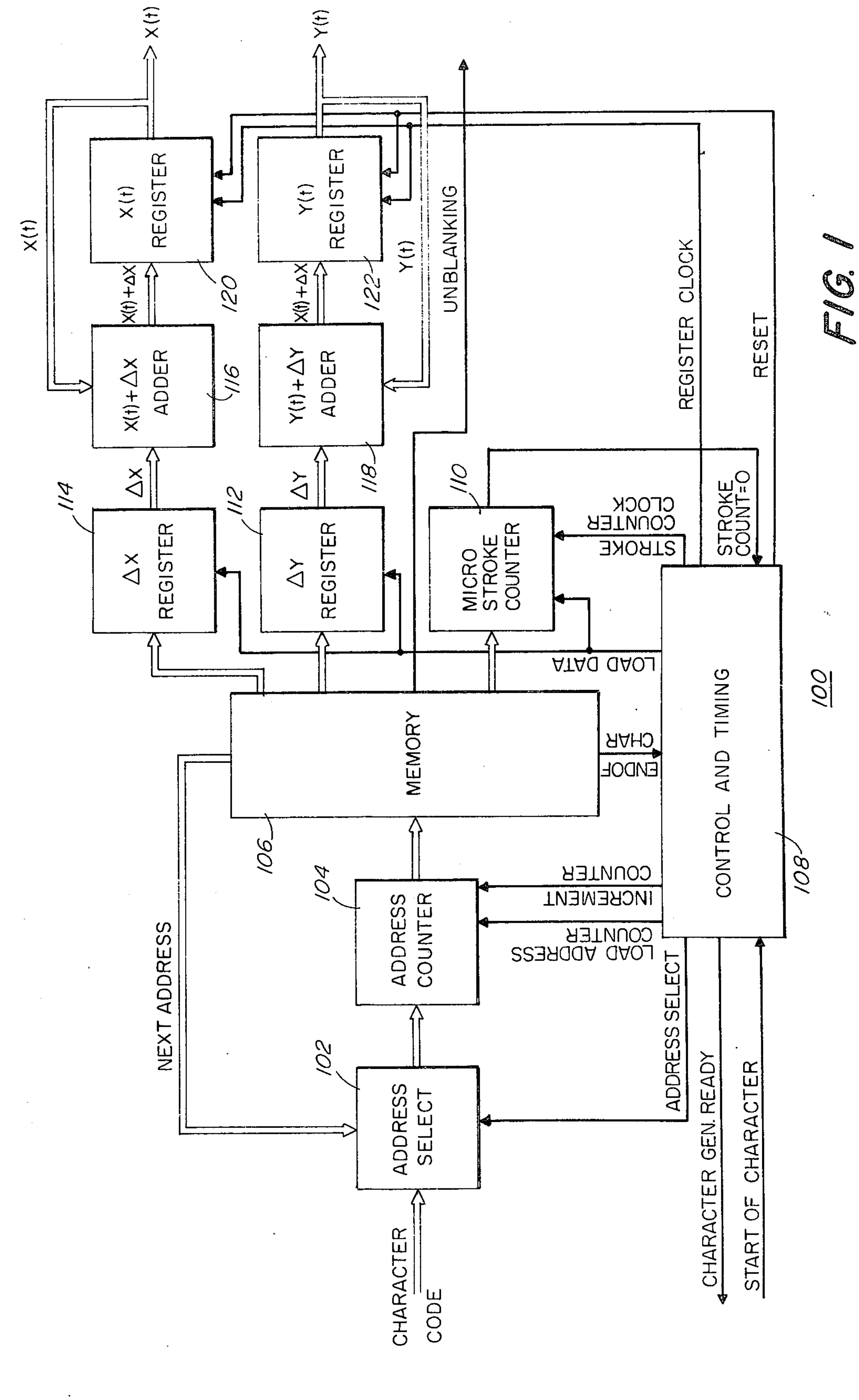
FIG. 1 is a block diagram of a character generator constructed in accordance with the teachings of the present invention.
Figure 3:
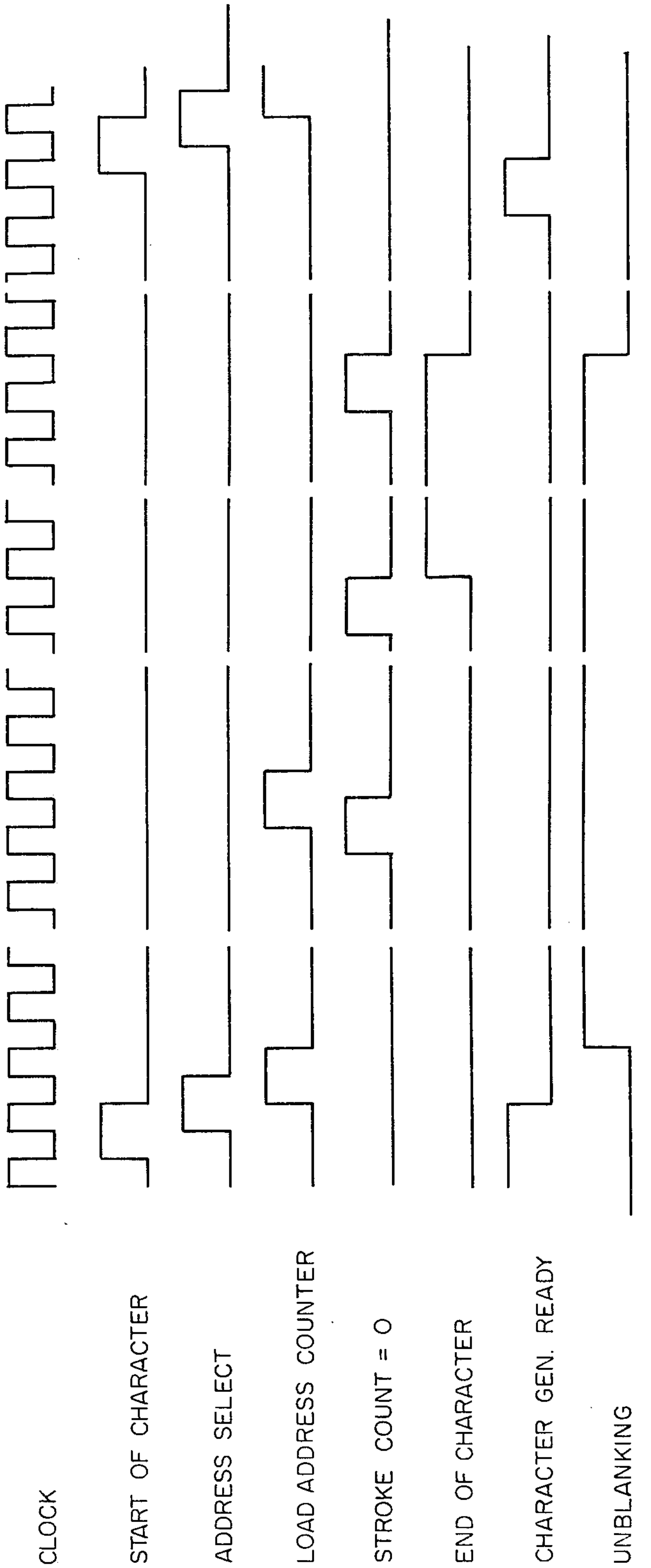
FIG. 3 is a series of timing waveforms illustrating the sequence of operation of a preferred embodiment of the invention.
Figure 4:
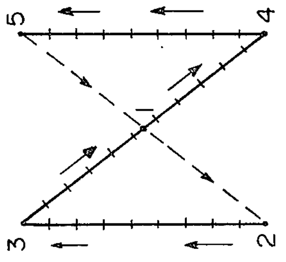
FIG. 4 is a drawing of the letter "N" divided into micro- and macro-strokes in accordance with the present invention.

Referring now in particular to FIGS. 1, 3, and 4, a character generator constructed in accordance with the teachings of the present invention will now be described. Referring in particular first to FIG. 4 there is shown the letter "N" as would be drawn by the character generator 100 of FIG. 1. The letter is constructed of three macro-strokes starting from point 2, i.e. from 2 to 3, 3 to 4, and 4 to 5. To draw the character upon the cathode-ray tube screen, the cathode-ray tube beam which rests at point 1 when not activated, would jump blanked from point 1 then move in sequence from 1 to 4 with appropriate beam current flowing. When the beam reaches point 5 it is reset back to point 1 with the beam current turned off to blank out the beam during this retrace interval. Each macro-stroke is made up of a number of smaller interconnected micro-strokes. The micro-strokes are indicated by the small lines perpendicular to and running through each macro-stroke. These small lines are not actually drawn upon the screen but are used by way of illustration only to show the length of the micro-strokes. The macro-strokes from point 1 to 2 and from point 3 to point 4 each have illustratively 8 micro-strokes whereas the macro-stroke from point 2 to point 3 has 10 such micro-strokes. The micro-strokes of each of the macro-strokes is approximately the same length independent of the total length of the macro-strokes of which they form a part or of the directional orientation of the macro-stroke. Hence, if each of the micro-strokes is drawn in the same period of time the writing rate among all micro-strokes will be substantially equal and no video compensation need be made for the differences in writing rates among either micro-strokes or macro-strokes. To draw the letter "N", the cathode-ray tube beam is started from point 1 in the direction of point 2 and moved 1 micro-stroke length at a time. In moving from point 1 towards point 2 only motion in the Y direction is required, there being no change in beam position in the X direction. In moving on the macro-stroke from point 2 towards point 3 movement is required in both the X and Y axes. It may be readily seen that to keep the same micro-stroke length between those micro-strokes in the macro-stroke from point 1 to point 2 and in the macro-stroke from point 2 to point 3 that the distance of movement in the Y axis in the latter case will be less than in the former.

Referring now to FIG. 1 there is shown the block diagram of a character generator, shown generally at 100, constructed in accordance with the teachings of the present invention. The commencement of the operation of the circuitry is caused by the presence of a character code on the input to address select circuit 102 and the presence of a Start of Character pulse to the control and timing circuitry 108. These are furnished by external circuitry. Address select circuit 102 couples the input character code to address counter 104 when the Address Select signal from control and timing circuitry 102 is in the logical 1 state and an address supplied from memory 106 when the Address Select signal is in logical 0 state. The address select signal immediately assumes the 1 state upon the presence of a Start of Character pulse. The timing relationship between the various signals may be followed throughout this discussion with reference to the timing waveforms shown in FIG. 3. The character code corresponds with the start location in memory 106 for data within the first set of data for the first macro-stroke of the desired character.

Figure 5:
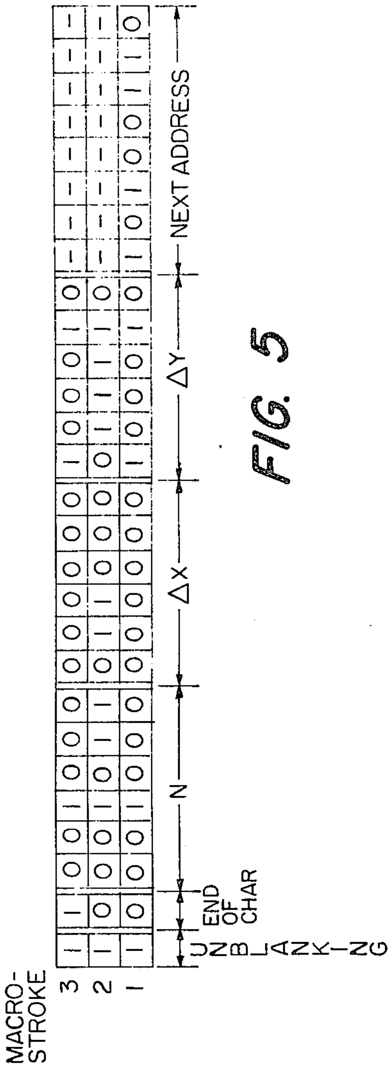
FIG. 5 is a data table illustrating the storing of data sets in the memory of FIG. 1 in accordance with the present invention.

The data set is organized in memory 106 as is shown in FIG. 5. Each set of data corresponds to one macro-stroke within the character. Each set of data has six major components: an unblanking bit, an end of character bit, the number of micro-strokes within the macro-stroke, $\Delta X$=the micro-stroke increment in the X axis, $\Delta Y$=the micro-stroke increment in the Y axis, and the address in memory of the next data set. The number of bits shown in FIG. 5 which are used for each of these components is not an absolute requirement as various numbers of bits can be used for each. By way of illustration only, N is shown as having six bits, $\Delta X$ and $\Delta Y$ as having six bits each, and the address as having eight bits. The end of character bit is always a single bit as is the unblanking bit. The bits of the data set may be arranged and the memory be constructed so that the application of a single address input to the memory will result in all bits of the data set being present on outputs of the memory at a single time. Alternatively, and as done in the preferred embodiment as shown in FIG. 1, the data set is divided into smaller groups of bits. Address counter 104 is preset to the address of the first group to be accessed and then incremented through consecutive addresses until all data within the data set has been accessed and extracted from the memory. In a still further embodiment, two or more data sets are extracted from the memory at a single time. In any case, the ΔX data is stored in ΔX register 114, the ΔY data stored in ΔY register 112, micro-stroke counter 110 is preset by the number of strokes in the macro-stroke, and the next address data is coupled to address select circuitry 102. A pulse on the Load Data signal from control and timing circuitry 108 causes this data to be loaded into the appropriate circuit.

The instantaneous digital present position is present at the outputs of X register 120 and Y register 122 at all times. These outputs are fed back respectively to X + ΔX adder 116 and Y + ΔY adder 118. Adders 116 and 118 add the ΔX and ΔY increments to their respective present positions. The newly computed present positions indicated by $X(t) + \Delta X$ and $Y(t) + \Delta Y$ are coupled back to the inputs of X and Y registers 120 and 122 and entered therein thus becoming the new present position. The addition of the same ΔX and ΔY increments continues until the end of the macro-stroke has been reached.

Micro-stroke counter 110, which has been preset with the number of micro-strokes within the particular macro-stroke, is decremented 1 count for each addition performed by adders 116 and 118 and registers 120 and 122. When the output count of micro-stroke counter 110 reaches 0 as indicated by a 1 state for the Stroke Count=0 signal the clock signal to registers 120 and 122 is shut off until new ΔX and ΔY values are loaded. Also at this time new data from memory 106 is loaded into ΔX register 114, ΔY register 112, the micro-stroke counter 110.

An unblanking signal is produced while the character position waveforms are being generated. In the examples shown in FIGS. 4 and 5 the unblanking bit stored in memory is continuously in the 1 state for all three macro-strokes allowing the beam to be unblanked as the "N" is drawn with contiguous and continuous macro-strokes. In the case of characters in which the macro-strokes are not all contiguous, the unblanking bit will be in the 0 state thereby turning off the cathode-ray tube beam during that portion of the characters where the beam is being positioned to the start of the next unblanked macro-stroke.

The end of character bit as stored in memory is set to a 1 for the last macro-stroke. This indicates that the last macro-stroke is currently being processed and that the control and timing circuit should set itself to load a new character code from the refresh memory. To this end, the character generator ready signal will be placed in the logical 1 state as soon as the character generator is prepared to accept a new character code and start of character pulse.

Referring now more particularly to FIG. 3, the sequence of operations will be discussed in further detail as illustrated by selected signals within the character generator. The Start of Character signal indicates that a new character code is presently on line and that the character generator should load the code into the address select circuitry 102. This pulse causes the Address Select signal to assume the 1 state during the next clock time period so as to select the character code as the number to be preset into the address counter 104. The Load Address Counter signal is then pulsed presetting address counter 104 with the character code as the preset number. After the next clock time pulse period, the Address Select signal resumes the 0 state so that the next address from memory 106 will become the new input preset number to address counter 104. The character generator proceeds with the generation of the macro-strokes until the Stroke Count=0 signal is present. Data sets for adjacent macro-strokes are stored in adjacent memory locations so that address counter 104 simply advances to the next count to retrieve the next data set. During the last macro-stroke of the character the End of Character signal assumes the 1 state. While the latter signal is in the 1 state the presence of Stroke Count=0 signal will cause the X and Y registers 120 and 122 to be reset to point 1. After X and Y registers 120 and 122 have been reset to 0, the Character Generator Ready signal is set to the 1 state and the generation of the next character and sequence begun.

Figure 2:
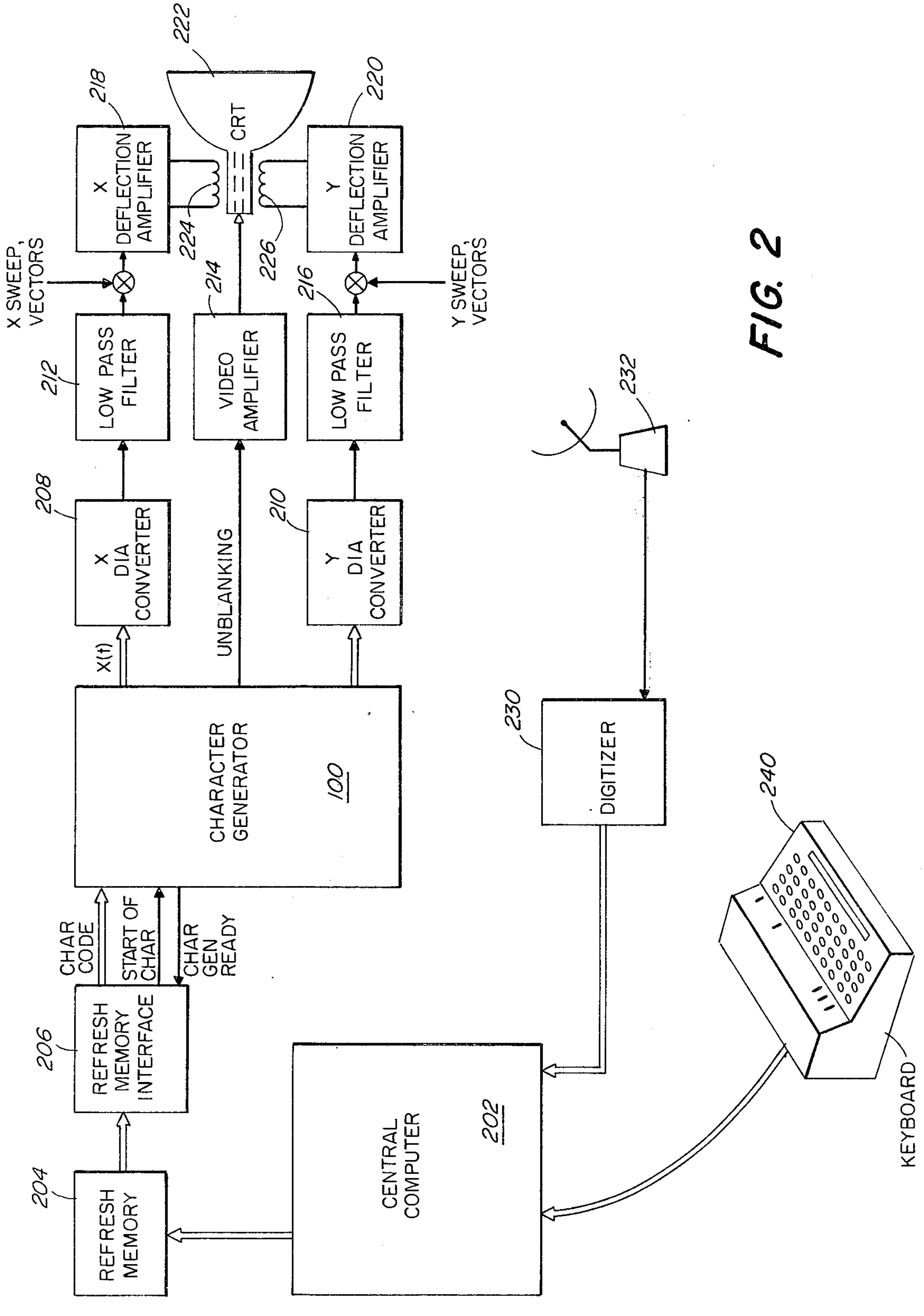
FIG. 2 is a block diagram of a radar display system embodying the present invention.

In FIG. 2 is shown a block diagram of a digital radar system employing the present invention. Radar antenna 232 transmits radar pulses and receives the returned echoes. The received output signals from radar antenna 232 are coupled to digitizer 230 which converts both the radar antenna position and output signal to digital form and couples them to central computer 202. Other inputs may be provided to central computer 202 such as from keyboard 240. In a typical systems application, the radar targets as digitized and stored in central computer 202 are tagged with alphanumeric character identifying indicia for display upon cathode-ray tube 222. This allows for easy identification by the operator of the various received targets.

Characters and other information to be displayed upon cathode-ray tube 222 are stored in refresh memory 204. Refresh memory 204 continuously cycles the data stored therein to its output lines at a rate sufficiently high to prevent flicker of data displayed upon cathode-ray tube 222.

Refresh memory interface circuit 202 couples the character codes from refresh memory 204 to character generator 100. The character codes are presented to character generator 100 only when the Character Generator Ready signal is in the 1 state. The presence of a new character code is indicated to the character generator 100 by a pulse on Start of Character line.

X and Y D/A converters 208 and 210 convert the digital position outputs of character generator 100 to corresponding analog voltage levels. While a macro-stroke is being written, the outputs of D/A converters 208 and 210 appear as "staircase" waveforms. Low-pass filters 212 and 216 smooth the "staircase" waveforms into a continuous ramp. Other signals such as those used to produce sweep, either PPI or raster, and other signals such as vector generator output signals are summed with the outputs of the low-pass filters 212 and 216 and the sums coupled to X and Y deflection amplifiers 218 and 220. Amplifiers 218 and 220 amplify the summed signals to an appropriate level for driving X and Y deflection coils 224 and 226 respectively. The unblanking signal from character generator 100 is amplified by video amplifier 214 and coupled to the cathode of cathode-ray tube 222 to modulate the beam current therein.

Although preferred embodiments of the invention have been described numerous modifications and alterations thereto would be apparent to one skilled in the art without departing from the spirit and scope of the present invention.

What is claimed is:

1. In combination:

means for storing data representing portions of straight line segments of characters to be displayed, said data comprising the magnitude and direction of each of said portions for at least two axes;

means for periodically accumulating said data at a constant rate for producing said straight line segments of said characters;

means for storing a digital number representing the number of said portions in each of said segments;

counting means operating in response to said number; and means for displaying said characters.

2. The combination of claim 1 wherein said means for storing said data and said means for storing said number comprise a read-only-memory.

3. The combination of claim 2 wherein said accumulating means comprises in combination:

digital adder means; and digital storage register means, inputs of said register means being coupled to outputs of said adder means and outputs of said register means being coupled to inputs of said adder means, other inputs of said adder means being coupled to means for supplying said digital data.

4. The combination of claim 3 further comprising means for addressing said means for storing said data and said means for storing said number.

5. The combination of claim 4 wherein said addressing means comprises a binary counter, outputs of said counter being coupled to address inputs of said storing means.

6. The combination of claim 5 further comprising means for presetting said counting means to a predetermined count.

7. A character generator for producing signals for deflecting the beam of a cathode-ray tube in predetermined character patterns, the character patterns being divided into straight line segments and said straight line segments each being divided into a predetermined number of portions, said character generator comprising in combination:

a memory, said memory storing data representing the magnitude and direction of said portions and the number of said portions in each straight line segment;

a plurality of registers for receiving said data from said memory and for storing said data;

first counter means, said first counter means operating in response to said number;

means for repetitively adding said data to a present stored position; and means for addressing said memory.

8. The combination of claim 7 wherein said portions are resolved into X and Y components and wherein one of said registers is provided for said X components and another of said registers is provided for Y components.

9. The combination of claim 8 wherein said memory comprises a read-only-memory.

10. The combination of claim 9 wherein said counter is operated one or more times for each addition performed by said repetitively adding means.

11. The combination of claim 9 wherein said memory further stores addresses in said memory corresponding to successive segments of said characters.

12. The combination of claim 11 wherein said addressing means further comprises:

second counter means;

means for presetting said second counter means, said presetting means presetting said counter with an externally supplied character code prior to the generation of the first straight line segment of each character and with said addresses from said memory for succeeding straight line segments of said character.

13. The combination of claim 9 wherein said memory further stores a plurality of unblanking bits, one of said unblanking bits being stored for each of said straight-line segments.

14. The combination of claim 9 wherein each of said portions among all straight-line segments within each of said characters is of substantially the same length.

15. A character generator for producing signals for deflecting the beam of a cathode-ray tube in predetermined character patterns, said character patterns each being divided into straight line segments, each of said straight line segments being divided into a predetermined number of connected straight line portions, said character generator comprising in combination:

a memory, a data word being stored in said memory for each of said segments in each of said character patterns, each of said data words comprising data representing the magnitude and direction of said straight line portions for each of two axes for the segment to which said data word corresponds, the number of said portions in said segment, and an address in said memory of the word corresponding to the next one of said segments;

a first counter for addressing said memory, said counter being preset prior to the display of the first one of said segments in each of said characters by a code corresponding to said character and preset for each succeeding segment in said character by said address within said data word;

a second counter for counting said number of said portions in each of said segments, said second counter being incremented one count for each of said segments, and said first counter being incremented in response to one or more outputs of said second counter; and two accumulators, said data representing said magnitude and direction of said straight line portions being coupled from said memory to said accumulators, one of said accumulators being provided for each of said axes.

16. The combination of claim 15 further comprising:

switching means for coupling one of said code and said address from within said data word to inputs of said first counter for presetting said first counter.

17. The combination of claim 16 further comprising:

two registers, inputs of said registers being coupled to said memory and outputs of said registers being coupled to said accumulators.

18. The combination of claim 16 further comprising:

two analog-to-digital converters, inputs of said converters being coupled to outputs of said accumulators.

19. The combination of claim 16 wherein each of said data words further comprises:

one or more binary bits for controlling video intensity upon display means of the segment to which said data word corresponds.

20. The combination of claim 19 wherein said binary bits are one in number.

21. The combination of claim 19 further comprising: cathode-ray tube display means.

22. The combination of claim 15 wherein some of said data words are used in the generation of a plurality of said characters.

* * * * *